US010667648B2

(12) United States Patent
Alden et al.

(10) Patent No.: US 10,667,648 B2
(45) Date of Patent: Jun. 2, 2020

(54) BURNER TUBE AND VENTURI FOR GAS GRILL

(71) Applicants: J. Michael Alden, Palatine, IL (US); Mohammed Shoeb, Streamwood, IL (US); Kevin James Schmeski, Romeoville, IL (US); Luis Diaz, Arrasate-Mondragon (ES); Jose Ignacio Mugica, Bergara (ES); Isabel Alava, Arrasate-Mondragon (ES); Inigo Albizuri, Muxika (ES)

(72) Inventors: J. Michael Alden, Palatine, IL (US); Mohammed Shoeb, Streamwood, IL (US); Kevin James Schmeski, Romeoville, IL (US); Luis Diaz, Arrasate-Mondragon (ES); Jose Ignacio Mugica, Bergara (ES); Isabel Alava, Arrasate-Mondragon (ES); Inigo Albizuri, Muxika (ES)

(73) Assignee: Weber-Stephen Products LLC, Palatine, IL (US)

(*) Notice: Subject to any disclaimer, the term of this patent is extended or adjusted under 35 U.S.C. 154(b) by 248 days.

(21) Appl. No.: 15/701,542

(22) Filed: Sep. 12, 2017

(65) Prior Publication Data
US 2017/0367532 A1 Dec. 28, 2017

Related U.S. Application Data

(63) Continuation-in-part of application No. 14/880,654, filed on Oct. 12, 2015.

(51) Int. Cl.
F24C 3/00 (2006.01)
A47J 37/07 (2006.01)
(Continued)

(52) U.S. Cl.
CPC .......... *A47J 37/0713* (2013.01); *F23D 14/10* (2013.01); *F23D 14/105* (2013.01); *F23D 14/26* (2013.01);
(Continued)

(58) Field of Classification Search
CPC ........ F23D 14/10; F23D 14/15; F23D 14/105; F23D 14/583
See application file for complete search history.

(56) References Cited

U.S. PATENT DOCUMENTS 1,077,073 A 10/1913 Hook
1,507,791 A 9/1924 Packer
(Continued)

FOREIGN PATENT DOCUMENTS

CN 201184593 Y 1/2009
CN 205191571 U 4/2016
(Continued)

OTHER PUBLICATIONS

Replacement burner tube available from Sears.
(Continued)

*Primary Examiner* — Jason Lau
(74) *Attorney, Agent, or Firm* — Vitale, Vickrey, Niro & Gasey LLP

(57) ABSTRACT

The present inventions provide, among other things, tapered burner tubes having raised gas ports and a smooth interior surface free from obstructions. Venturi members creating a smooth flow of the gas/air mixture along the top of the burner tube are also provided.

16 Claims, 6 Drawing Sheets

(51) Int. Cl.

| | |
|---|---|
| *F23D 14/58* | (2006.01) |
| *F23D 14/10* | (2006.01) |
| *F23D 14/64* | (2006.01) |
| *F23D 14/26* | (2006.01) |
| *F23D 14/84* | (2006.01) |
| *F23N 1/02* | (2006.01) |

(52) U.S. Cl.
CPC ............ *F23D 14/58* (2013.01); *F23D 14/64* (2013.01); *F23D 14/84* (2013.01); *F23N 1/02* (2013.01); *F23D 2900/00003* (2013.01)

(56) References Cited

U.S. PATENT DOCUMENTS

| | | | |
|---|---|---|---|
| 2,041,706 | A | 5/1936 | Hahn |
| 2,044,528 | A | 6/1936 | Guhl |
| 2,424,654 | A | 7/1947 | Blount |
| 2,755,851 | A | 7/1956 | Dow |
| 2,781,088 | A | 2/1957 | Ayers |
| 2,808,878 | A | 10/1957 | Ayers |
| 3,269,165 | A | 8/1966 | Anderson |
| 3,446,566 | A | 5/1969 | Miller |
| 3,567,137 | A * | 3/1971 | Cavestany ............ F23D 14/045 239/566 |
| 3,733,901 | A | 3/1973 | Halmi |
| 3,990,838 | A | 11/1976 | Jerde |
| 4,118,175 | A | 10/1978 | Riehl |
| 4,346,845 | A | 8/1982 | Meyerhoff |
| 4,418,456 | A | 12/1983 | Riehl |
| 4,509,371 | A | 4/1985 | Wellman |
| 5,062,788 | A | 11/1991 | Best |
| 5,423,675 | A | 6/1995 | Kratsch |
| 5,746,588 | A | 5/1998 | Binzer |
| 6,364,657 | B1 * | 4/2002 | O'Donnell ............ F23D 14/06 431/286 |
| 6,450,800 | B1 | 9/2002 | Cash |
| 6,699,036 | B2 | 3/2004 | Schlosser |
| 6,793,487 | B2 | 9/2004 | Hubbauer |
| 6,945,774 | B2 | 9/2005 | Shoeb |
| 7,506,645 | B2 | 3/2009 | Offredi |
| 2004/0173200 | A1 | 9/2004 | Shoeb |
| 2010/0154775 | A1 * | 6/2010 | Robinson ................ F23D 14/06 126/39 E |
| 2017/0108213 | A1 | 4/2017 | Voss |

FOREIGN PATENT DOCUMENTS

| | | |
|---|---|---|
| DE | 19540772 A1 | 5/1997 |
| DE | 10004159 A1 | 8/2001 |
| EP | 3156724 A1 | 4/2017 |
| FR | 2093148 A5 | 1/1972 |
| GB | 364105 A | 1/1932 |
| GB | 590092 A | 7/1947 |
| GB | 1147268 A | 4/1969 |
| GB | 1162874 A | 8/1969 |
| GB | 2174189 A | 10/1986 |
| JE | 2600650 A1 | 7/1977 |
| JP | S4888409 U | 10/1973 |
| JP | S4972082 U | 6/1974 |
| JP | S5029558 U | 4/1975 |
| JP | S5280867 U | 6/1977 |
| JP | S52131515 U | 10/1977 |
| JP | S58181075 U | 12/1983 |
| JP | S62184852 U | 11/1987 |
| JP | H1038230 A | 2/1998 |
| JP | 2007225267 A | 9/2007 |
| MY | 126290 A | 9/2006 |

OTHER PUBLICATIONS

Extended European Search Report dated Mar. 10, 2017 in corresponding European Application No. 16193255.3.
Office Action and Search Report dated Jul. 13, 2017 in corresponding Taiwanese Application No. 105132789.
CSA Group, Outdoor cooking gas appliances, ANSI Z21.58-2014, Jul. 2015.
Examination Report No. 2 dated Oct. 24, 2017 in corresponding Australian Patent Application No. 2016238926.
Extended Search Report dated Feb. 5, 2019 in corresponding European Application No. 18192938.1.
Second Office Action dated Feb. 22, 2019 in corresponding Chinese Application No. 201610889069.3.
Examination Report No. 1 dated May 2, 2019 in corresponding Australian Application No. 2018202159.
Examination Report dated Feb. 12, 2019 in corresponding European Application No. 16193255.3.
First Office Action dated Apr. 18, 2018 in corresponding Chinese Application No. 201610889069.3.
Office Action dated Jul. 23, 2019 in corresponding Japanese Application No. 2018-170171.
First Office Action dated Jul. 30, 2019 in corresponding Chinese Application No. 201811062434.9.

* cited by examiner

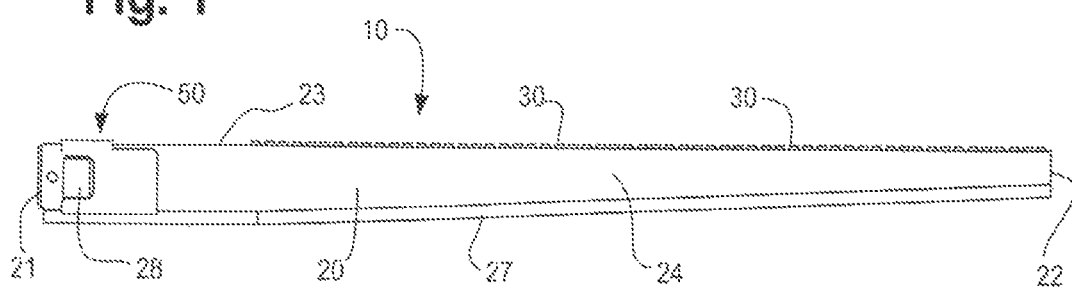
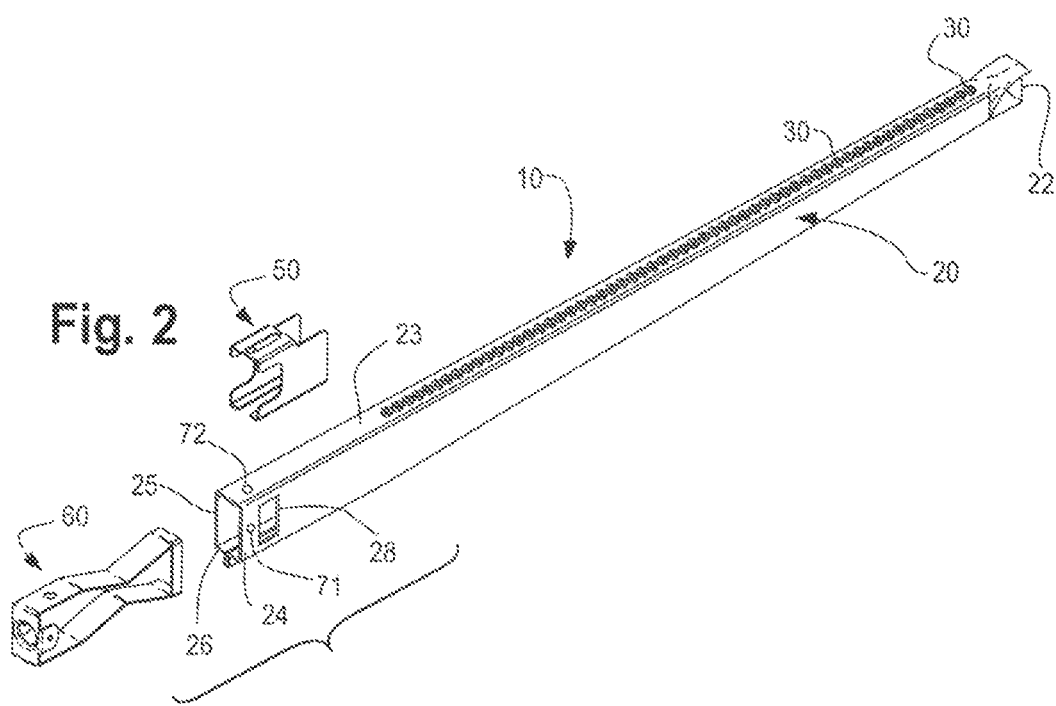
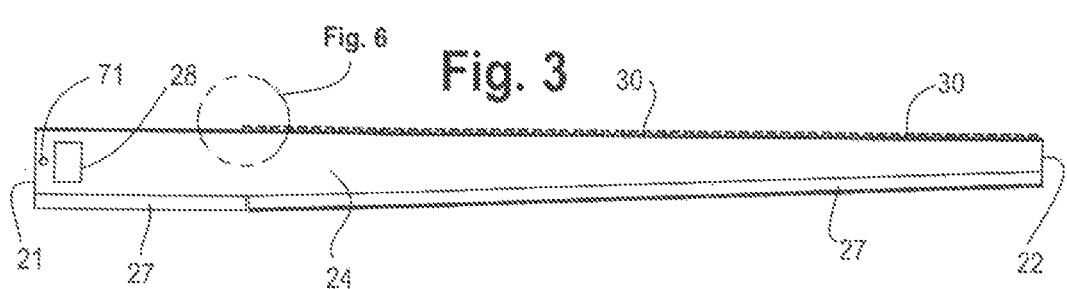
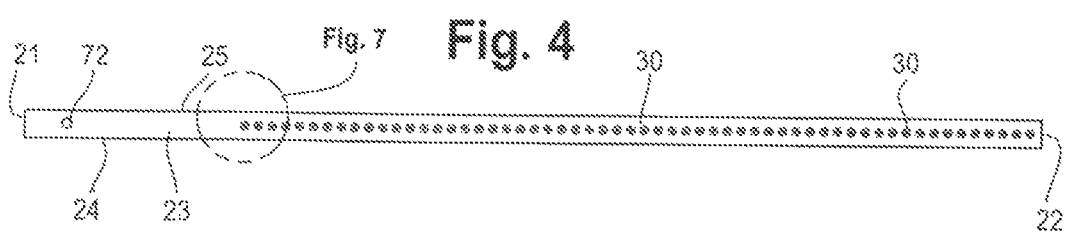

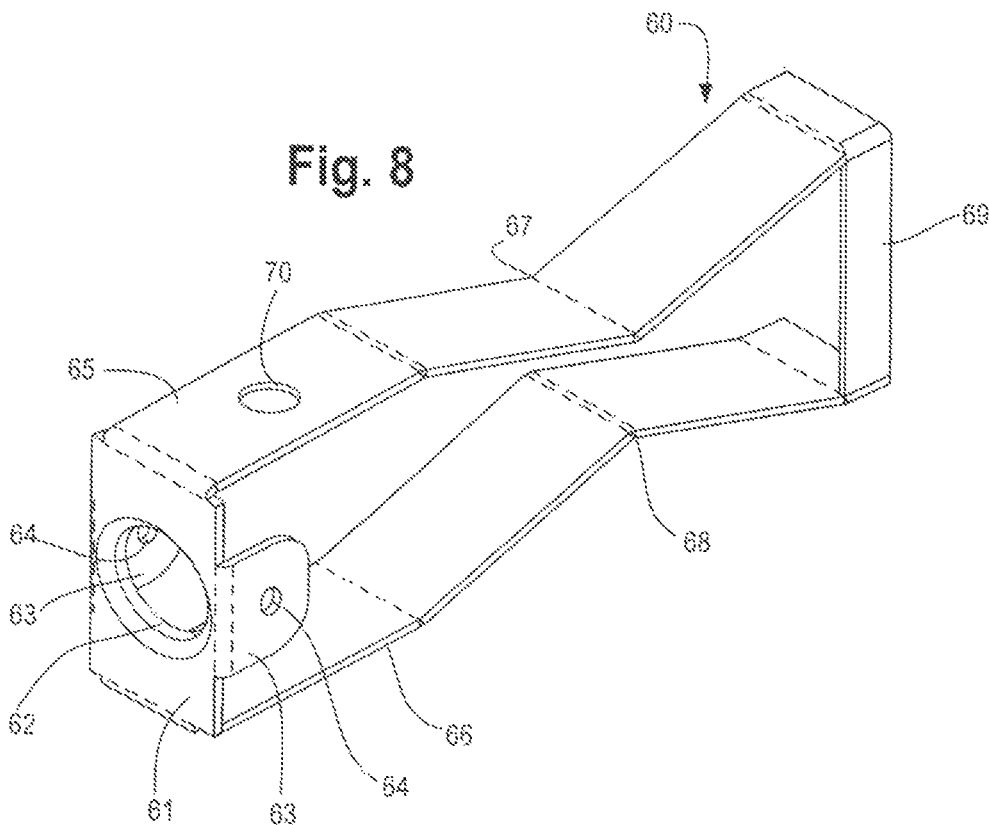
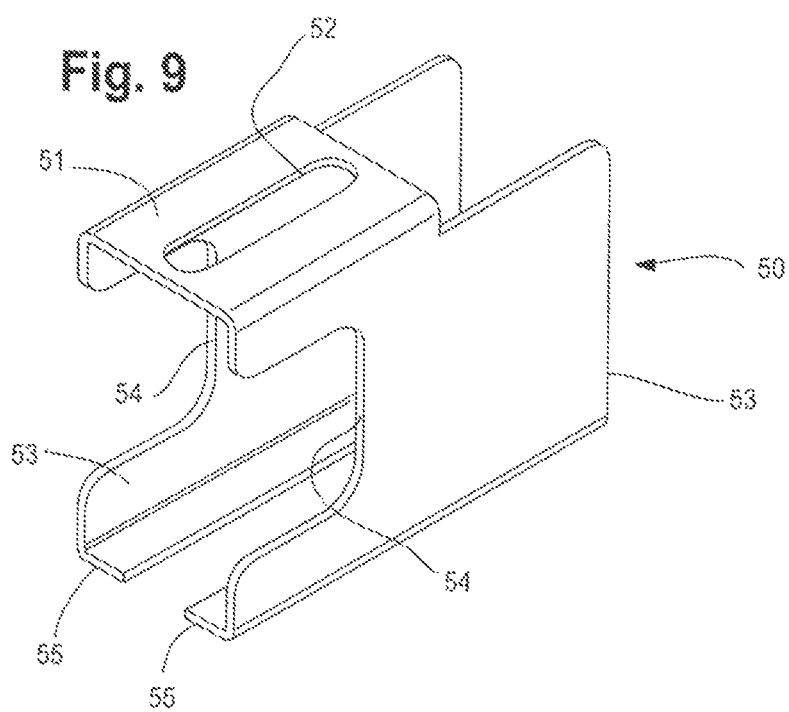

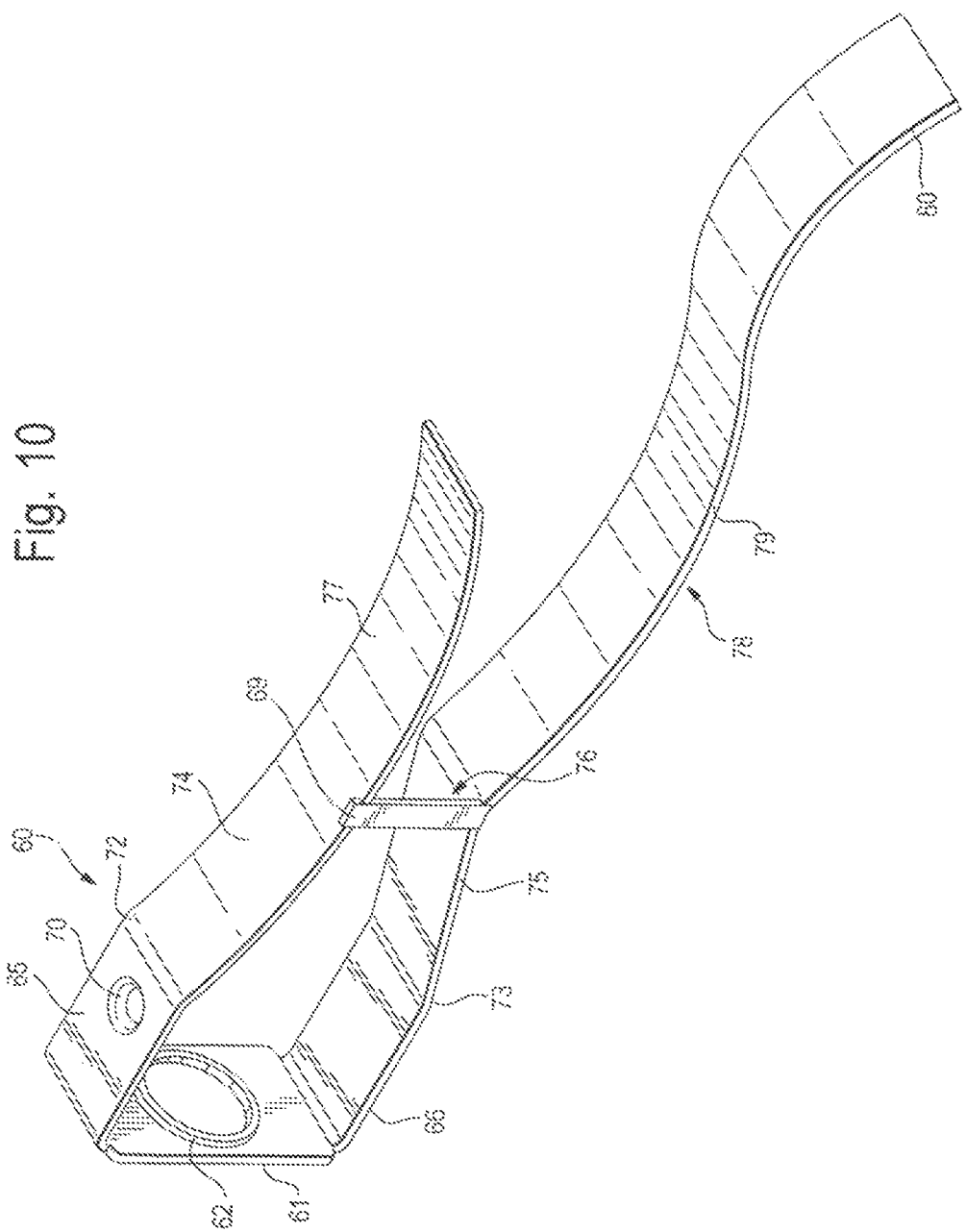

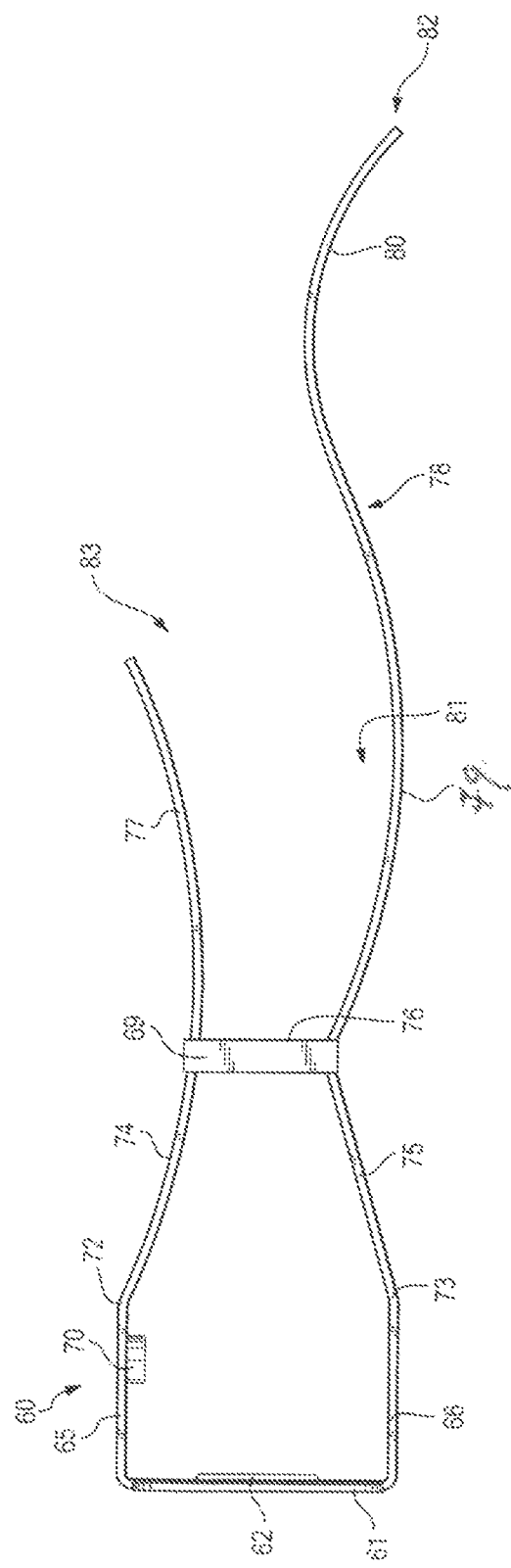

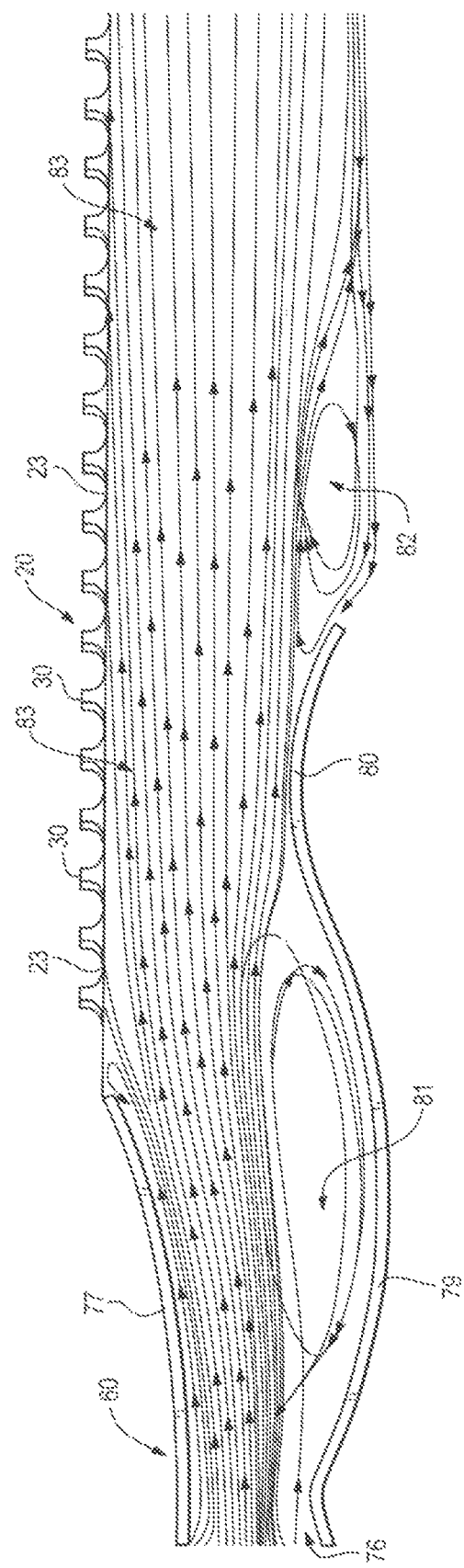

BURNER TUBE AND VENTURI FOR GAS GRILL

STATEMENT OF PRIORITY

This application is a continuation-in-part of U.S. application Ser. No. 14/880,654, filed Oct. 12, 2015, and claims priority thereto and incorporates by reference such application in its entirety.

FIELD OF THE INVENTION

The present inventions relate to burners and venturis for use in gas appliances such as gas grills. More particularly, the present inventions relate to burner tubes (including tapered burner tubes) having raised gas ports and a smooth interior surface, and/or to venturis that provide smooth and consistent flow of the gas/air mixture along the length of the burner tube adjacent to the gas ports.

BACKGROUND OF THE INVENTION

Burners and burner tube assemblies, including those used in gas grills, are well known. Most conventional gas grills include burner tube assemblies that provide a plurality of burner tubes, gas valves and a gas distribution manifold. Each burner tube has a length defined by an open end and a closed end and a plurality of outlet ports along the length of the burner tube between the open and closed ends. The open end of the burner tube typically includes an air shutter that is used to adjust the gas and combustion air mixture, as well as a venturi region to increase the velocity of the gas/air mixture in the tube. The open end of the burner tube is connected to the neck of a gas control valve, which is in fluid communication with a gas distribution manifold, which is in fluid communication with a gas source such as a tank.

For cost, manufacturing and other reasons, many conventional burner tubes are constructed from hollow welded circular tubing, often made from stainless steel. A venturi region is typically formed by pinching the tube near the open end of the burner tube. The venturi increases the velocity of the fuel/air mixture from the gas nozzle into the burner tube. An air shutter is also typically provided on the open end of the burner tube to adjust the fuel to air mixture.

Also for cost and other manufacturing reasons, the gas ports of typical burner tubes are punched into the tube from the outside of the tube to the inside, either on the top or sides of the tube. This results in burrs or other obstructions on the inside of the burner tube that can disrupt the flow of the fuel/air mixture and provide poor flame quality. Moreover, the flames produced by such burner tubes typically sit directly on the surface of the burner tube itself. This increases the temperature of the burner tube and can result in increased corrosion and clogging of the ports as well as a shorter life of the burner tube. In addition, many known burner tubes have a substantially uniform cross-section along their length that can result in uneven or inconsistent fuel pressure along the length of the tube. This can also negatively affect flame quality.

Thus, there is a need for improved burner tubes that provide improved flame characteristics and quality and which increase the life of the burner tube. There is also a need for burner tubes that enable smooth fuel/air flow throughout their length, as well as consistent pressure throughout the length of the burner tube. The present inventions solve the above described and other deficiencies and provide new features and advantages over known burner tubes.

There is also a need for improved venturis for use with burner tubes, either alone or in conjunction with the burner tubes of the present inventions. For example, it is possible, due to variation between gas train components, that turbulence can form at the upper portion of the burner tube adjacent to the gas outlet port. This can result in poor flame quality and/or the failure to ignite the gas/air mixture. Thus, there is a need for venturis that direct the turbulent gas/air mixture to the bottom of the burner tube and provide a smooth and consistent flow of the gas/air mixture along the top of the burner tube adjacent to the gas ports. This results in a more stable gas/air delivery system and better flame quality. The present inventions solve the deficiencies of know venturis and provide new features and advantages over known venturis, alone or in conjunction with the burner tubes of the present inventions.

SUMMARY OF THE INVENTION

In general, the burner tubes and venturis of the present inventions are part of burner assemblies used with gas grills. The present inventions preserve the advantages of known burner tubes and venturis and provide new features and advantages, some of which are described below and others which will be apparent to those of ordinary skill in the art.

In accordance with the present inventions, a venturi member for use in a burner tube for a gas grill, the burner tube having a length, a top with gas ports and a bottom is provided. The venturi member includes a front face having a top and a bottom, the front face including an opening to accommodate a neck of a gas valve; a top flange extending rearwardly from the top of the front face and a substantially parallel bottom flange extending rearwardly from the bottom of the front face; a downwardly sloping top constricting flange extending rearwardly from the top flange and an upwardly sloping bottom constricting flange extending rearwardly from the bottom flange, the top constricting flange and bottom constricting flange converging to form a throat area. An upper arcuate portion extending rearwardly from the top constricting flange and a lower arcuate portion extending rearwardly from the bottom constricting flange are also provided.

The venturi member may further include an upper arcuate portion that has a concave shape generally adjacent to the top of the burner tube and/or a lower arcuate portion that has a concave portion and a convex portion generally adjacent to the bottom of the burner tube. In a preferred embodiment, the upper arcuate portion occupies the space where turbulence may form along the top of the burner tube and adjacent to the gas ports. Also in a preferred embodiment, a first turbulence area is created in the concave portion of the lower arcuate portion and a second turbulence area is created adjacent to the end of the convex portion of the lower arcuate portion. The top constricting flange may be arcuate.

A burner for use in a gas grill is also provided. It includes a tapered burner tube having an open end, a closed end and a substantially hollow and smooth interior which is free of burrs or other obstructions. The burner tube includes an upper surface, the upper surface including a plurality of gas ports having a height projecting above the upper surface of the tube and an opening at the top of the height, the opening having a diameter. A venturi member at the open end of the burner tube is also provided, the venturi member including a front face having a top and a bottom, the front face including an opening to accommodate a neck of a gas valve; a top flange extending rearwardly from the top of the front face and a substantially parallel bottom flange extending rearwardly from the bottom of the front face; a downwardly sloping top constricting flange extending rearwardly from the top flange and an upwardly sloping bottom constricting flange extending rearwardly from the bottom flange, the top constricting flange and bottom constricting flange converging to form a throat area; an upper arcuate portion extending rearwardly from the top constricting flange wherein the upper arcuate portion has a concave shape generally adjacent to the top of the burner tube; and, a lower arcuate portion extending rearwardly from the bottom constricting flange wherein the lower arcuate portion has a concave portion and a convex portion generally adjacent to the bottom of the burner tube.

A preferred venturi may further include an upper arcuate portion that occupies the space where turbulence may form at the top of the burner tube adjacent to the gas ports and a first turbulence area is created in the concave portion of the lower arcuate portion and a second turbulence area is created adjacent to the end of the convex portion of the lower arcuate portion.

In a preferred burner tube embodiment, the gas port height of the burner is between approximately 0.020 and 0.062 inches and the opening diameter is between approximately 0.075 and 0.110 inches. More specifically and preferred, the gas port height is approximately 0.060 inches and the port diameter is approximately 0.093 to 0.099 inches. In addition and as preferred, the ratio of gas port height to gas port opening diameter is between approximately 0.640 and 0.650, and preferably greater than 0.5.

In a preferred burner tube embodiment, the height of the gas ports is between 0.020 and 0.062 inches and the area of the gas port opening is between 0.006 and 0.008 square inches. In a particular preferred embodiment, the height of the gas port is approximately 0.060 inches and the area of the opening is approximately 0.007 square inches. Alternatively, the port opening may be generally circular and have a diameter. In such an embodiment, the height of the gas port is between 0.020 and 0.062 inches and the diameter of the opening is between 0.075 and 0.110 inches. More particularly, the height of the gas port is approximately 0.060 inches and the diameter of the opening is approximately 0.098 inches. An air shutter that cooperates with the open end of the burner tube and venturi member may also be provided.

Accordingly, it is an object of the present inventions to provide a safe, reliable burner tube that efficiently operates over a wide range of gases and mixtures and a wide range of input pressures.

It is another object of the present inventions to provide a tapered burner tube that enables consistent pressure along the length of the tube.

Still another object of the present inventions is to provide a burner tube having a smooth interior surface that enables laminar fluid flow along the length of the interior of the tube.

Yet another object of the present inventions is to provide raised gas ports that enable better flame characteristics and help maintain a cooler burner tube temperature.

Still yet another object of the present inventions is to manufacture the burner tube by forming the raised gas ports from what will be the inside of the burner tube to what will be the outside of the burner tube so that the interior of the burner tube is smooth and free from burrs of other obstructions.

An additional object of the present inventions is to reduce corrosion and gas port clogging of the burner tube.

Still an additional object of the present inventions is to provide larger gas port openings that provide improved flame characteristics and are less susceptible to corrosion, yet are not prone to backflash or flame pull back into the burner tube when in use.

Yet an additional objection of the present inventions is to enable greater material selection as well as manufacturing and cost advantages.

A further object of the present inventions is to provide a burner tube having improved flame characteristics and less material degradation.

Still yet another object of the present inventions is to provide an improved burner tube having a tapered cross-section, a venturi member and an air shutter that cooperates with the open end of the burner tube to adjust the fuel/air mixture.

Still a further object of the present inventions is to provide an improved venturi member and including one that may function with a burner tube having a non-circular cross-section and which improves flame quality and/or ignition.

Still yet an additional object of the present inventions is to provide an improved venturi member that produces the smooth flow of the gas/air mixture along the top of the burner tube adjacent to the gas outlet ports.

Still yet a further object of the present inventions is to provide an improved venturi member that forces any turbulence in the gas/air mixture to the bottom of the burner tube and away from the gas outlet ports.

Still yet a further object of the present inventions is to provide an improved venturi member that provides smooth flow of the gas/air mixture adjacent to the gas ports of the burner tube and provides a stable flow of the gas/air mixture and which improves flame quality and/or ignition.

INVENTOR'S DEFINITION OF THE TERMS

The following terms which may be used in the various claims and/or specification of this patent are intended to have their broadest meaning consistent with the requirements of law:

As used herein, "front" or "forward" is used by reference to the front or toward the front of a gas grill which typically includes the control panel, gas control knobs and the like. However, it is understood that the present inventions may be applicable to grills that have side controls and burner tubes that extend from side to side of the grill.

As used herein, "rear" or "rearward" is used by reference to the back or toward the back of a typical gas grill.

As used herein, "air shutter" shall mean the device, typically found at the open end of the burner tube, that cooperates with the open end of the burner tube to permit the adjustment of an opening of the burner tube to control the fuel to combustion air mixture.

As used herein, "ignition system" shall mean devices that are capable of generating sparks to ignite the fuel/air mixture emitted from the outlet ports of a burner tube.

Where alternative meanings are possible, in either the specification or claims, the broadest meaning is intended consistent with the understanding of those of ordinary skill in the art. All words used in the claims are intended to be used in the normal, customary usage of grammar, the trade and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which:

FIG. 1 is a side plan view of a preferred embodiment of a burner tube of the present invention, shown with a preferred air shutter and an alternative embodiment of a venturi member installed and shown with the closed end prior to closure;

FIG. 2 is an exploded perspective view of the components of the embodiment of FIG. 1 and showing the closed end of the burner tube closed;

FIG. 3 is a side plan view of a preferred embodiment of the burner tube of the present invention of FIG. 1;

FIG. 4 is a top plan view of the preferred burner tube of FIG. 3;

FIG. 8 is a perspective view of an embodiment of a venturi member of the present invention;

FIG. 9 is a perspective view of a preferred air shutter of the present invention;

FIG. 10 is a perspective view of a preferred embodiment of a venturi member of the present invention;

FIG. 11 is a side view of the preferred embodiment of the venturi member of FIG. 10; and, FIG. 12 is a cross-sectional view of portions of a preferred embodiment of the venturi member of the present invention installed in a typical preferred burner tube of the present invention and showing the areas of smooth and turbulent flow of the gas/air mixture.

DETAILED DESCRIPTION OF PREFERRED EMBODIMENTS

Figure 5:
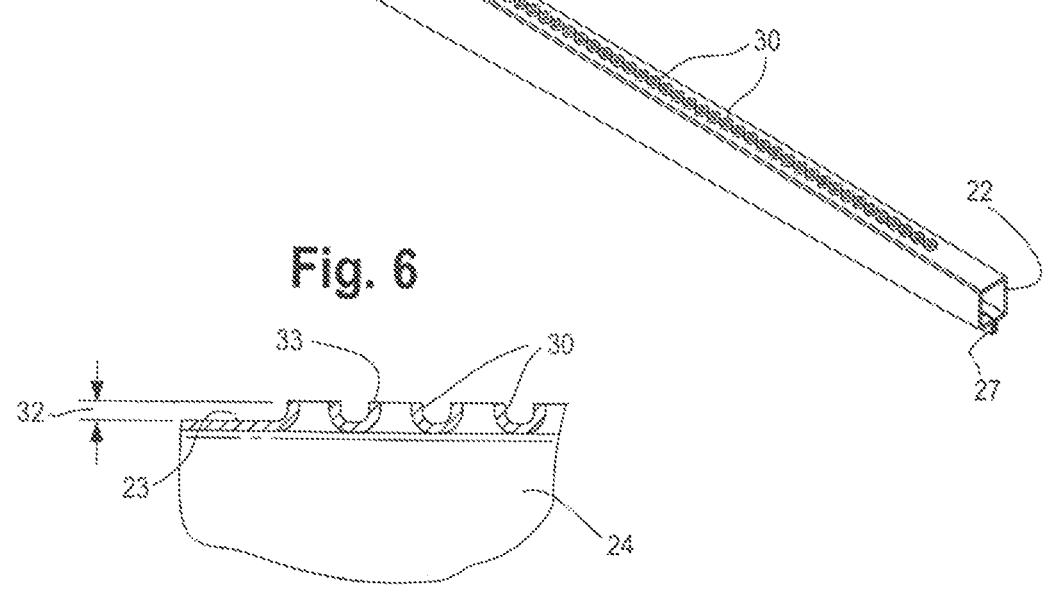
FIG. 5 is a perspective view of the preferred burner tube of FIG. 3 and showing the closed end of the burner tube open.

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

The overall aspects of a burner assembly 10 of the present inventions may be seen by reference to FIGS. 1 and 2. Burner assembly 10 includes a preferred burner tube 20, an air shutter 50 and a venturi member 60. A preferred embodiment of venturi member 60 is shown in FIGS. 10-12. Preferred burner tube 20 has a length between an open end 21 and a closed end 22. Open end 21 is typically toward the front of the grill adjacent to a gas valve and gas distribution manifold (not shown) and the closed end 22 is typically secured to the rear of a grill. In most situations, a grill will include a plurality of burner tubes 20 spaced parallel to each other. As will be understood by those of skill in the art, the present inventions are equally applicable to grills having the controls on the side and burner tube 20 extending from side to side of the grill.

In a preferred embodiment, burner tube 20 has a rectangular cross-sectional shape, with an upper surface 23, two side surfaces 24, 25 and a bottom surface 26 forming a substantially hollow interior. It will be understood by those of skill in the art that the cross-sectional shape of burner tube 20 does not have to be rectangular, as in the preferred embodiment. For example, the cross-sectional shape may be square, circular or oval. It will be further understood that the venturi members 60 of the present inventions may also be used with non-rectangular burner tubes 20. In the preferred embodiment, the burner tube 20 is tapered, i.e., there is a gradual decrease in cross-sectional area along the length from the open end 21 to the closed end 22. This permits a constant pressure of the fuel/air mixture throughout the length of the burner tube 20. A window 28 is provided on each side 24, 25 near the open end 21 of burner tube 20. The window 28, in conjunction with air shutter 50 (FIG. 9), is used to adjust the air/fuel mixture as will be understood by those of skill in the art. In addition, a venturi member 60 is provided which accelerates the gas/air mixture introduced into burner tube 20 which helps draw in combustion air, mix the gas and combustion air and equalize pressure and velocity. A preferred venturi member 60 also provides smooth and consistent flow along the length of the tube 20 adjacent to the gas ports 30.

A plurality of gas ports 30 are also provided. In a preferred embodiment, gas ports 30 are equally spread along the top surface 23 of the burner tube 20. It will be understood by those of skill in the art that the number and spacing of ports, as well as the size of the cross-sectional shape of burner tube 20, is calculated or determined based upon the BTU's desired from each burner tube 20. Importantly, the gas ports 30 are formed or extruded from the inside of tube 20 to the outside of tube 20. In this manner, unlike conventional burner tubes which are punched from the outside to the inside of the tube, there are no burrs or obstructions on the inside of the burner tube 20 to obstruct the fuel/air flow or to make that flow turbulent. As a result, desirable blue flame characteristics, among other advantages, are achieved.

In the preferred embodiment and preferred method of its manufacture, burner tube 20 is constructed from a single sheet of appropriately sized and shaped material, typically stainless steel. On what will become the inside of burner tube 20, gas ports 30 are formed or extruded on what will be the top surface 23. Once the ports 30 are formed from the inside to the outside, the sheet of material is then folded to form the upper 23 and side surfaces 24, 25, as well as bottom surface 26. A tab 27 is provided and welded together so that a substantially hollow, tapered and burr-free burner tube 20 is formed. See FIGS. 1, 2, 3 and 5. It will be understood by those of skill in the art that there are methods, other than the preferred method, of manufacturing tapered burner tube 20 and ports 30 consistent with the goals and objects of the present inventions.

Figure 6:
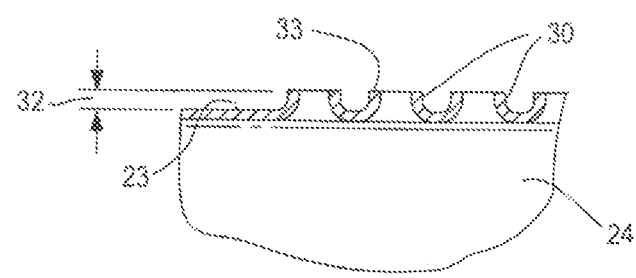
FIG. 6 is a cross-sectional detail view of the preferred raised gas ports of the present invention.
Figure 7:
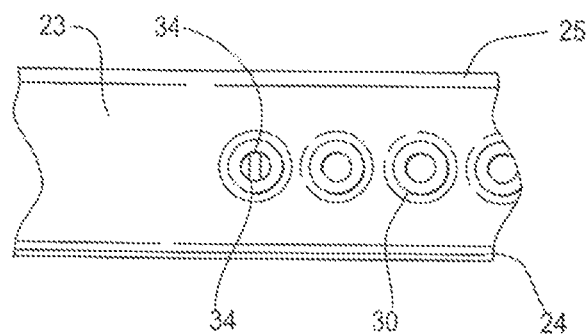
FIG. 7 is a top detail plan view of the preferred raised gas ports of the present invention.

The preferred raised gas ports 30 of the present inventions may better be seen by reference to FIGS. 6 and 7. Each port 30 has a height 32 measured from the upper surface 23 with an opening 33 at the top of the height 32. Each opening 33 has a diameter 34. In the preferred embodiment, the openings 33 are circular. It will be understood by those of skill in the art that openings 33 may be another shape and that the dimensions discussed herein for diameter may be readily converted to area if, for example, square or rectangular openings are used. Because the opening 33 of port 30 is raised above upper surface 23 of burner tube 20, the flame is also lifted above upper surface 23 of burner tube 20. This improves flame quality and reduces the temperature of tube 20 during grilling, which increases the life of the tube 20 and prevents corrosion and clogging of the port openings 33. It will be understood by those of skill in the art that ports 30 may alternatively be located on one or both side surfaces 24, 25. It will also be understood that non-rectangular shapes of burner tube 20 may also be used consistent with the present inventions.

Tests have shown that the ratio of port height 32 to port opening 33 diameter 34 is important to proper and efficient flame quality and burner tube 20 longevity. The ideal theoretical port height 32 to port opening 33 diameter 34 is 1:1. However, in practice, that ratio is unobtainable when cost effectively manufacturing a burner tube 20 of the present inventions. Since the ports 30 are typically formed from the material of upper surface 23, there is only so much material available to form the ports 30, as will be understood by those of skill in the art. In addition, tests have also shown that in burner tubes 20 sized for use in typical gas grills, the port opening 33 diameter 34 should not exceed 0.110" to avoid flame pullback into burner tube 20. Thus, it has been determined that the maximum, reasonably feasible port height 32 is approximately 0.020" to 0.062". And, the preferred port opening 33 diameter 34 is between approximately 0.075" and 0.110". In the preferred embodiment, the port height 32 to opening diameter 34 ratio is approximately 0.645. This preferred ratio is achieved using a preferred port height 32 of 0.060" and a preferred port opening diameter 34 of 0.093". This preferred configuration, along with the taper of burner tube 20, provides the best flame quality, reduces clogging and extends the life of the burner tube 20.

An alternative embodiment of a venturi member 60 may be seen by reference to FIG. 8. Venturi member 60 includes a front face 61 having an opening 62 to accommodate the neck of a typical gas valve (not shown). A rearwardly projecting side tab 63 having a hole 64 is also provided on each side of front face 61. A top flange 65 and a bottom flange 66 project rearward of face 61. Top flange 65 includes a v-shaped portion having an apex 67. Similarly, bottom flange 66 includes an inverted v-shaped portion having an apex 68. As can be seen in FIG. 8, the space between the top and bottom flanges 65 and 66 becomes constricted, forming what is commonly known as a throat or throat area (76 in FIGS. 10 and 11), where the two opposing apexes 67 and 68 converge. A stabilizer brace 69 is provided at the rear of the member to support the upper and lower flanges 65 and 66 and maintain their spacing when installed into the open end 21 of burner tube 20. A hole 70 may be provided on upper flange 65 near the front in order to accommodate a screw used to secure air shutter 50 to the burner tube 20 (see FIGS. 2 and 9), as hereinafter described.

As shown in FIGS. 1 and 2, venturi member 60 is inserted into the open end 21 of burner tube 20. It may be affixed to the burner tube 20 using a screw (not shown) through hole 64 of tab 63 into holes 71 in the sides 24, 25 of burner tube 20. It will be understood that other means may be used to attach venturi member 60 to burner tube 20. When inserted into burner tube 20, the neck of a typical gas valve (not shown) is inserted into opening 62. As the fuel/air mixture passes between the space between upper apex 67 and lower apex 68, it velocity is increased. It will be understood by those of skill in the art that venturi member 60 is shaped and sized to fit within the open end 21 and coincides with the cross-sectional shape of burner tube 20.

A preferred embodiment of venturi member 60 may be seen by reference to FIGS. 10, 11 and 12. Like the above described alternative venturi member 60, preferred venturi member 60 includes a front face 61 having an opening 62 to accommodate the neck of a typical gas valve (not shown). A top flange 65 and a bottom flange 66 are also provided. A hole 70 may be provided on top flange 65 which may be used to secure venturi member 60 and/or air shutter 50 to burner tube 20. Although not shown in FIGS. 10 and 11, side tabs 63 (see FIG. 8) may be provided on the preferred embodiment if desired as a means of attachment to the burner tube 20.

The top flange 65 and bottom flange 66 of preferred venturi member 60 are generally parallel to each other in the portion of venturi member 60 that receives the gas from the gas nozzle (not shown) and where it is attached to open end 21 of burner tube 20. Top flange 65 extends rearwardly from face 61 to a top transition point 72. Similarly, bottom flange 66 extends rearwardly to a bottom transition point 73.

Extending rearwardly from top transition point 72 is a top constricting flange 74. Top constricting flange 74 extends downwardly from top transition point 72. Top constricting flange 74 may be straight or slightly curvilinear as shown in FIGS. 10 and 11. Similarly, extending rearwardly from bottom transition point 73 is an upwardly sloping bottom constricting flange 75. Top constricting flange 74 and bottom constricting flange 75 converge at throat area 76. Throat area 76 of preferred venturi member 60 forms the narrowest space in venturi member 60 and is roughly the equivalent of the space between v-shaped top apex 67 and inverted v-shaped bottom apex 68 of the embodiment as shown in FIG. 8. Throat region 76 accelerates and helps mix the gas and air introduced into burner tube 20. A stabilizer brace 69 may also be provided.

Extending rearwardly of top constricting flange 74 and beginning at approximately throat area 76 is an upper arcuate portion 77. Upper arcuate portion 77 is generally concave and terminates at a height approximately equivalent in height to top flange 65. Upper arcuate portion 77 serves to, among other things, occupy the space near the top of the burner tube 20 where undesirable turbulence could form near the gas ports 30. Extending rearwardly from bottom constricting flange 75 and beginning at approximately throat area 76 is a lower arcuate portion 78. Lower arcuate portion 78 includes a concave portion 79 and a convex portion 80. As shown in FIG. 11, lower arcuate portion 78 transitions smoothly in an undulating fashion between concave portion 79 and convex portion 80. Lower arcuate portion 78 terminates at a point roughly equivalent in height to bottom flange 66.

As shown in FIGS. 11 and 12, the concave portion 79 of lower arcuate portion 78 forms a first area of turbulence 81. A second area of turbulence 82 is created after convex portion 80 of lower arcuate portion 78. The end of convex portion 80 roughly coincides with the bottom 26 of burner tube 20. The unique shape of upper arcuate portion 77 occupies the space at the top of burner tube 20 where undesired turbulence may most likely occur. Lower arcuate portion 78 creates what is commonly known as a coanda effect at the bottom 26 of burner tube 20. Specifically, as the gas/air mixture is accelerated and leaves throat area 76, turbulence is created in the first 81 and second 82 areas of turbulence (see FIG. 12). The smooth, undulating lower arcuate portion creates the desired coanda effect in the first and second areas of turbulence 81/82. The areas of turbulence 81/82 are created at the bottom portion of burner tube 20 such that an area of smooth flow 83 is created in the upper portion of burner tube 20 adjacent to the gas ports 30 (see FIG. 12). This creates smooth and uniform flow at gas ports 30, creating better, more stable and uniform flows resulting in better flame consistency along the length of the burner tube 20. It also provides for better ignition (see FIG. 12).

It will be understood by those of skill in the art that the length of smoothly curved arcs in lower arcuate portion 78, as well as their curvature, may be adjusted depending upon, among other things, the volume of the burner tube 20, the length of burner tube 20 and the arrangement of the gas ports 30. In addition, if desired, additional concave 79 and convex 80 portions may be provided by extending the length of lower arcuate portion 78 along the length of burner tube 20. It has been determined, however, that two such portions are effective in creating the desired coanda effect in burner tube 20 of the size, configuration and volume typically used in grilling applications. In addition, it will be understood by those of skill in the art that the above described arcuate portions of upper 77 and lower 78 arcuate portions may be formed from a single piece of material or may be separate pieces of material attached together, such as by welding.

A preferred air shutter 50 of the present inventions may be seen by reference to FIG. 9. As will be understood by those of skill in the art, air shutter 50 cooperates with the window 28 at the open end 21 of burner tube 20 to permit adjustment of the combustion air to fuel mixture. Preferred shutter 50 includes a top 51 having a slot 52 which is used to secure shutter 50 through hole 72 to burner tube 20 once in the proper position for the desired mixture. Shutter 50 includes two sides 53, each having a recess 54 and two bottom sections 55. It will be understood by those of skill in the art that a space between bottom members 55 is provided to accommodate tab 27 on the bottom of burner tube 20 that is part of a preferred manufacturing process. The recesses 54 of sides 53 accommodate the attachment flanges 63 of venturi member 60 when it is attached to burner tube 20.

When in use, the neck of a gas valve is inserted into opening 62 of venturi member 60 with the open end of burner tube 20 typically at the front of the grill. The closed end 22 of burner tube 20 is movably secured to a rear of the grill and the open end slidingly connected to the valve neck by the air shutter 50. In this manner, tube 20 may expand and contract as necessary during use. The gas is injected into venturi member 60 and mixed with the desired amount of combustion air using air shutter 50. The velocity of the fuel/air mixture is accelerated by the venturi member 60 (and in particular throat area 76 of the preferred embodiment of venturi member 60 and between v-shaped apex 67 and inverted v-shaped apex 68 of the venturi 60 embodiment of FIG. 8) and flows down the length of burner tube 20. Because of the taper of burner tube 20, the pressure throughout the length of the tube 20 is relatively constant. And, because of the unique configuration of preferred venturi member 60 (see FIGS. 10 and 11), smooth and stable flow 83 along the top of burner tube 20 adjacent to ports 30 is created (see FIG. 12).

When lit, the flame sits on top of the raised gas ports 30 at the opening 33. Since the flame is lifted off of the upper surface 23 of burner tube 20, the burner tube 20 remains cooler. This results in less port 30 clogging and less corrosion of the burner tube 20. In this manner, a longer life of burner tube 20 and high flame quality may be achieved. In addition, when the preferred port height 32 to port opening 33 diameter 34 is used, flame quality is further increased.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A venturi member for use in a burner tube for a gas grill, the burner tube having a length, a top with gas ports and a bottom, the venturi member comprising:
   a front face having a top and a bottom, the front face including an opening to accommodate a neck of a gas valve;
   a top flange extending rearwardly from the top of the front face and a substantially parallel bottom flange extending rearwardly from the bottom of the front face;
   a downwardly sloping top constricting flange extending rearwardly from the top flange and an upwardly sloping bottom constricting flange extending rearwardly from the bottom flange, the top constricting flange and bottom constricting flange converging to form a throat area;
   an upper arcuate portion extending rearwardly from the top constricting flange; and
   a lower arcuate portion extending rearwardly from the bottom constricting flange, wherein the lower arcuate portion has a concave portion and a convex portion generally adjacent to the bottom of the burner tube.

2. The venturi member of claim 1 wherein the lower arcuate portion has a concave portion and a convex portion generally adjacent to the bottom of the burner tube.

3. The venturi member of claim 1 wherein a first turbulence area is created in the concave portion of the lower arcuate portion and a second turbulence area is created adjacent to the end of the convex portion of the lower arcuate portion.

4. The venturi member of claim 2 wherein the upper arcuate portion occupies the space where turbulence may form at the top of the burner tube adjacent to the gas ports and a first turbulence area is created in the concave portion of the lower arcuate portion and a second turbulence area is created adjacent to the end of the convex portion of the lower arcuate portion.

5. A burner for use in a gas grill, comprising:
   a tapered burner tube having an open end, a closed end and a substantially hollow and smooth interior which is free of burrs or other obstructions and an upper surface, the upper surface including a plurality of gas ports having a height projecting above the upper surface and an opening at the top of the height, the opening having a diameter;
   a venturi member at the open end of the burner tube, the venturi member including:
   a front face having a top and a bottom, the front face including an opening to accommodate a neck of a gas valve;
   a top flange extending rearwardly from the top of the front face and a substantially parallel bottom flange extending rearwardly from the bottom of the front face;
   a downwardly sloping top constricting flange extending rearwardly from the top flange and an upwardly sloping bottom constricting flange extending rearwardly from the bottom flange, the top constricting flange and bottom constricting flange converging to form a throat area;

an upper arcuate portion extending rearwardly from the top constricting flange wherein the upper arcuate portion has a concave shape generally adjacent to the top of the burner tube; and, a lower arcuate portion extending rearwardly from the bottom constricting flange wherein the lower arcuate portion has a concave portion and a convex portion generally adjacent to the bottom of the burner tube.

6. The burner of claim 5 wherein the upper arcuate portion occupies the space where turbulence may form at the top of the burner tube adjacent to the gas ports and a first turbulence area is created in the concave portion of the lower arcuate portion and a second turbulence area is created adjacent to the end of the convex portion of the lower arcuate portion.

7. The burner of claim 6 wherein the gas port height is between approximately 0.020 and 0.062 inches and the gas port opening diameter is between approximately 0.075 and 0.110 inches.

8. The burner assembly of claim 7 wherein the gas port height is approximately 0.060 inches and the port diameter is approximately 0.093 to 0.99 inches.

9. The burner assembly of claim 6 wherein a ratio of gas port height to gas port opening diameter is between approximately 0.640 and 0.650.

10. The burner assembly of claim 9 wherein the gas port height to gas port opening diameter ratio is greater than 0.5.

11. The burner assembly of claim 6 wherein the height of the gas ports is between 0.020 and 0.062 inches and the area of the gas port opening is between 0.006 and 0.008 square inches.

12. The burner assembly of claim 6 wherein the height of the gas port is approximately 0.060 inches and the area of the gas port opening is approximately 0.007 square inches.

13. The burner assembly of claim 5 wherein an air shutter is provided that cooperates with the open end of the burner tube to permit adjustment of the fuel and air mixture going into the burner tube.

14. The burner assembly of claim 6 wherein the port opening generally circular, having a diameter.

15. The burner assembly of claim 14 wherein the height of the gas ports is between 0.020 and 0.062 inches and the diameter of the opening is between 0.075 and 0.110 inches.

16. The burner assembly of claim 15 wherein the height of the gas ports is approximately 0.060 inches and the diameter of the opening is approximately 0.098 inches.

* * * * *